(12) United States Patent
Gaskins et al.

(10) Patent No.: US 6,675,287 B1
(45) Date of Patent: Jan. 6, 2004

(54) METHOD AND APPARATUS FOR STORE FORWARDING USING A RESPONSE BUFFER DATA PATH IN A WRITE-ALLOCATE-CONFIGURABLE MICROPROCESSOR

(75) Inventors: Darius D. Gaskins, Austin, TX (US); G. Glenn Henry, Austin, TX (US); Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 0 days.

(21) Appl. No.: 09/545,026

(22) Filed: Apr. 7, 2000

(51) Int. Cl.[7] .................................................. G06F 9/38
(52) U.S. Cl. ....................................................... 712/216
(58) Field of Search ................................. 712/216, 219, 712/225

(56) References Cited

U.S. PATENT DOCUMENTS

| | | | | |
|---|---|---|---|---|
| 5,043,868 A | * | 8/1991 | Kitamura et al. | 712/218 |
| 5,671,444 A | * | 9/1997 | Akkary et al. | 710/52 |
| 5,721,857 A | * | 2/1998 | Glew et al. | 712/23 |
| 5,751,983 A | * | 5/1998 | Abramson et al. | 712/216 |
| 6,112,019 A | * | 8/2000 | Chamdani et al. | 712/214 |
| 6,351,797 B1 | * | 2/2002 | Beard et al. | 711/207 |
| 6,360,298 B1 | * | 3/2002 | Osanai et al. | 711/133 |

OTHER PUBLICATIONS

Handy, The Cache Memory Book, 2nd Edition, 1998, pp. 72, 77.*
Implementation of Write Allocate in the K86 processors Application Note, Nov. 1998. pp. 1,3.

* cited by examiner

Primary Examiner—Eddie Chan
Assistant Examiner—David J. Huisman
(74) Attorney, Agent, or Firm—E. Alan Davis; James W. Huffman

(57) ABSTRACT

An apparatus for forwarding storehit data within a pipelined microprocessor is provided. The apparatus has a plurality of response buffers that receive data from a bus that couples a system memory to the microprocessor and multiplexing and forwarding logic. When a store instruction generates a miss of the microprocessor's instruction cache, the store results are written not only to store buffers for updating the cache, but also to one of the response buffers. The missing cache line implicated by the store miss is requested from the system memory, received into the response buffer, and merged with the store results. The cache is updated with the merged data. However, in addition, storehit conditions with the store results generated by load instructions coming down the pipeline are satisfied from the response buffer. The multiplexing and forwarding logic is capable of forwarding the store results from the response buffer to the pipeline both before and after the missing cache line is received.

26 Claims, 5 Drawing Sheets

Cache-Miss, Write-Allocate

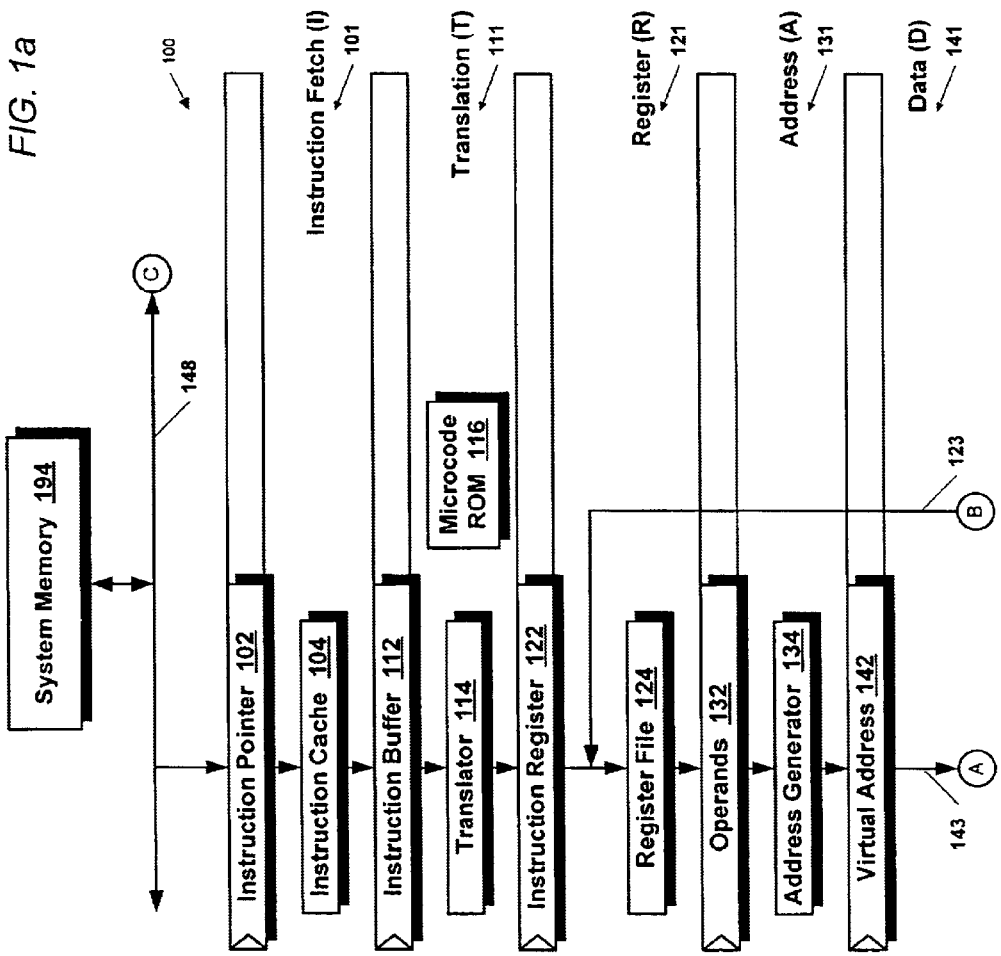

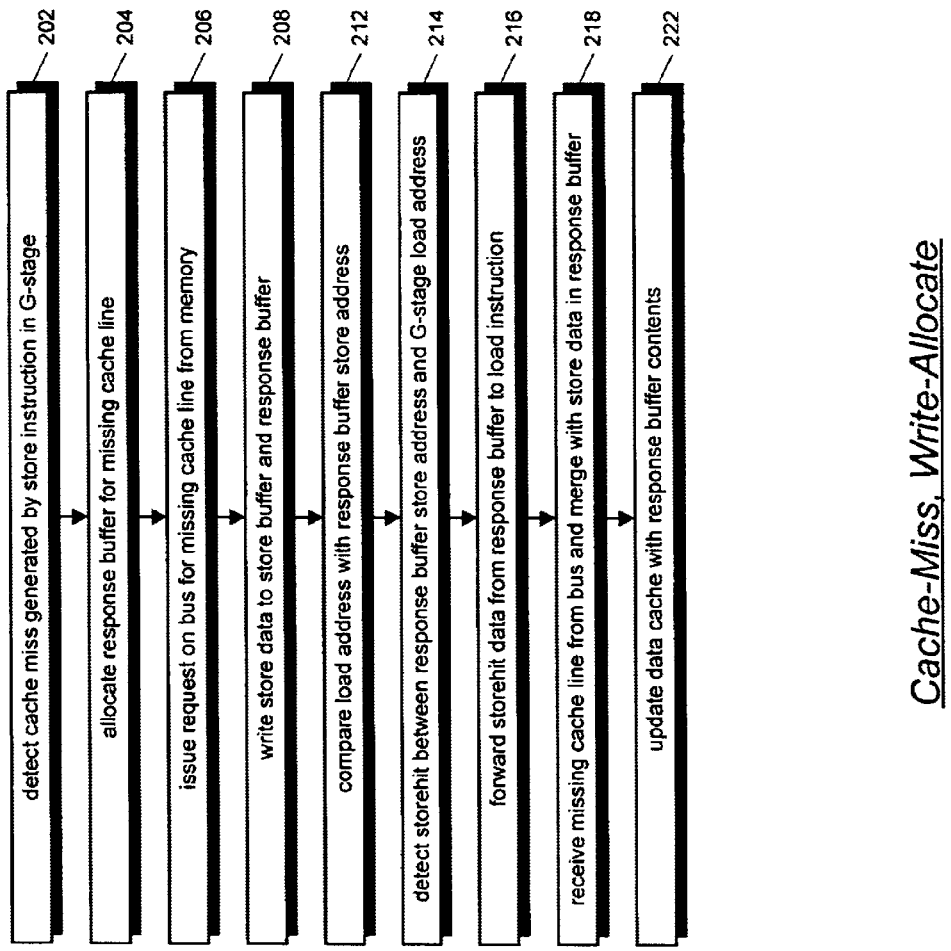

Cache-Hit

METHOD AND APPARATUS FOR STORE FORWARDING USING A RESPONSE BUFFER DATA PATH IN A WRITE-ALLOCATE-CONFIGURABLE MICROPROCESSOR

BACKGROUND OF THE INVENTION

1. Field of the Invention

This invention relates in general to the field of pipelined microprocessors, and more particularly to forwarding store-hit data between stages of microprocessor pipelines.

2. Description of the Related Art

A microprocessor has an instruction pipeline that sequentially executes instructions from an application program in synchronization with a microprocessor clock. The instruction pipeline is divided into stages, each of which performs a specific task that is part of an overall operation that is directed by a programmed instruction. The programmed instructions in a software application program are executed in sequence by the microprocessor. As an instruction enters the first stage of the pipeline, certain tasks are accomplished. The instruction is then passed to subsequent stages for accomplishment of subsequent tasks. Following completion of a final task, the instruction completes execution and exits the pipeline. Execution of programmed instructions by a pipeline microprocessor is very much analogous to the manufacture of items on an assembly line.

Early pipeline microprocessors were not sophisticated enough to have multiple instructions executing in different pipeline stages at the same time. Consequently, a given instruction would be fetched from memory and would proceed through the various pipeline stages until it completed execution. Following this, a next instruction would proceed through the various stages through completion. And because early pipeline microprocessors had only a few pipeline stages, the inefficient utilization of stage resources was not deemed to be significant.

As uses for microprocessors started to proliferate, more stringent requirements began to be imposed, particularly with respect to speed. The obvious approach for increasing processing speed was to allow multiple instructions to simultaneously proceed down the pipeline at the same time. Clearly, this change increased instruction throughput because resources within each pipeline stage were more efficiently used. But with this change came a problem: What if one instruction executing in an early pipeline stage required a result that was yet to be provided by another instruction executing in a later pipeline stage? This situation is common to software programs; instructions that are close in proximity tend to perform tasks using the same operand. For example, a control algorithm may compute a true error signal value by adding a small number to a current error signal value and then comparing this value to some other signal that is input to the microprocessor. The structure of the algorithm is to add a first operand to a second operand to produce a result. The result is then tested to see if the computed value is tolerable. If not, then the first operand is added to the computed result to obtain a second result. The second result is tested, and so on. Even in this simple algorithm, it is evident that every other instruction utilizes the last computed result. When a given instruction executing in one stage of the pipeline requires a result that is to be provided by another instruction executing in a subsequent stage of the pipeline, the given instruction is referred to as a dependent instruction. This is because the operand required by the dependent instruction depends upon generation of the result by the other instruction.

To deal with dependent instructions, microprocessor designers added interlock logic to existing pipeline designs. The interlock logic spanned the stages of a microprocessor where the dependency situation could occur. During normal operation, non-dependent instructions were successively advanced through the pipeline stages in synchronization with the clock. When the interlock logic encountered a dependent instruction, it simply stalled execution of the dependent instruction by inserting slips into the pipeline, until the result required by the dependent instruction was generated and made available for retrieval as an operand.

In spite of the advances provided through interlock logic, demands for faster throughput continued to press microprocessor designers. Consequently, an alternative to interlock logic was developed that allowed dependent instructions to proceed down the pipeline without incurring slips. This alternative is known as a result distribution bus, or a bypass bus, or a result forward bus. In essence, the result distribution bus originates at the stage of the pipeline in which results are generated. When a result is generated, it is copied to the bus and then routed to all of the earlier stages that are affected by dependent instructions. If a dependent instruction is present within any of the earlier stages, then logic within that stage performs all of the operations necessary to properly configure the required operand from the provided result. The result distribution approach can be thought of as a one-to-many distribution scheme because one result can be distributed to several dependent instructions at the same time.

The result distribution scheme has prevailed as the principal technique for expediting the execution of dependent instructions, until more recent times, when demands for further throughput increases have compelled microprocessor designers to substantially alter the design of stages within the pipeline. These alterations to the pipeline can be comprehended through use of an assembly line analogy. Suppose an assembly line is set up with three stages, where each of the three stages is required to insert two screws in a product that flows down the line, for a total of six screws. Further, suppose that the time required to insert a screw is one minute. To send a product through the assembly line, then, requires six minutes. If multiple products are sent down the line, then it follows that one product rolls off the line every two minutes.

A simple enhancement to the line will double the production throughput: Reconfigure the line into six stages, where each stage is required to insert only one screw. While with this architectural change it still takes six minutes to pass a product through the line, the improvement now is that one product rolls off of the line every minute. The speed and throughput are doubled by doubling the number of stages and halving the operations performed in each stage.

To improve the throughput of current microprocessors, designers are taking the very same approach: pipeline stages are being added and the functional requirements for each stage are being decreased. Thus, faster clock speeds can be applied and instruction throughput is increased.

But increasing the number of pipeline stages has highlighted a deficiency with the result distribution technique for dealing with dependent instructions. Whereas early microprocessor pipelines consisted of only a few stages, the attendant logic required to implement a result distribution bus was not much of an issue. But for every added stage in the execution pipeline, an additional set of result distribution logic must be provided. In other words, the logic required to implement a result distribution bus is directly proportional to the number of stages that required distribution of the result. Add to this the fact that the presence of more stages requires logic elements that drive the result signals to be more powerful. Moreover, the timing to distribute results to multiple pipeline stages is not only a function of the number of stages, but is also a based upon the location of the stage that is physically farthest from the origination stage. Hence, circuit complexity, power, and timing problems arise when a result distribution scheme is applied to more advanced pipeline architectures that have more pipeline stages.

One situation in which one instruction executing in an higher pipeline stage requires a result generated by a preceding instruction executing in a lower pipeline stage is referred to as a storehit condition. A storehit condition exists when a load instruction requests data generated as the result of a store instruction executing ahead of the load instruction in the pipeline. That is, the load instruction specifies a load address for load data, wherein the load address matches a store address for store data specified by a previous store instruction, and the store data is still in the microprocessor pipeline, i.e., has not yet been updated in the microprocessor data cache.

In a storehit condition, the load instruction must be provided with coherent data, i.e., the newest data associated with the load address. Thus, the microprocessor cannot supply the data from its data cache or go to system memory to get the data since the newest data is within the pipeline and not in the data cache or system memory. Hence, either the microprocessor stalls to wait for the storehit data to be updated in the data cache, or it forwards the data using one of the techniques described above. Neither alternative is desirable for the reasons described above.

It has been observed that storehit conditions occur relatively frequently in modern microprocessors, particularly in x86 microprocessors. This phenomenon is largely attributed to the fact that modern compilers recognize the relatively small number of registers available in the x86 register file and the fact that virtually every contemporary x86 processor has a large built-in data cache that is essentially accessible at the same speed as the register file. Therefore, when the compilers run out of registers in the register file, they use the data cache as a huge register file. In particular, compilers have been observed to generate code that causes storehit conditions in the following situations: where a loop counter variable is stored in a memory location; where a memory location is used as a temporary location for a sequence of arithmetic operations; and where a stack location is accessed within a very short instruction sequence due to the calling of a very short subroutine, i.e., a push of the return address, followed by a jump to the subroutine, followed by a very small number of instructions of the subroutine, followed by a pop of the return address generating a storehit on the location of the return address.

When a store instruction executes, the microprocessor determines whether the data address specified by the store instruction, i.e., the store address, is present in the data cache of the microprocessor. That is, the microprocessor determines whether a cache miss occurred. If a cache miss occurs, then the microprocessor will schedule a write of the data to system memory. If the store address is to a cacheable line of memory, the microprocessor may perform a write-allocate operation, if the microprocessor is configured to do so. To perform a write-allocate operation, the microprocessor first fetches from the system memory the cache line of data implicated by the store data, i.e., the cache line in which the store address is included. The store data is then merged with the fetched cache line and the cache is updated with the merged data. Although the read of the cache line from memory may take longer than simply writing the store data to memory, performance gains may be realized by the fact that subsequent stores to the cache line will hit in the cache as a result of the write-allocate operation. Subsequent cache hits are probable because software memory accesses tend to occur within proximity of each other, commonly referred to as the locality of reference principle.

Therefore, what is needed is an apparatus in a pipeline microprocessor that provides high performance storehit detection and forwarding.

SUMMARY

To address the above-detailed deficiencies, it is an object of the present invention to provide an apparatus that reduces the number of storehit pipeline stalls. Accordingly, in attainment of the aforementioned object, it is a feature of the present invention to provide an apparatus for forwarding storehit data within a pipelined microprocessor having a cache memory and coupled to a system memory. The apparatus includes at least one response buffer and forwarding logic. The response buffer receives data from the system memory and updates the cache in response to a store instruction miss of the cache. The response buffer also receives store results of the store instruction in response to the cache miss. The forwarding logic forwards the store results from the response buffer to a load instruction in the pipeline in response to a storehit condition between the load and store instructions.

An advantage of the present invention is that only minimal changes are required to forward storehit data from a response buffer. The present invention utilizes response buffers that already exist within the microprocessor to forward storehit data. Finally, the present invention also utilizes byte aligning logic associated with the response buffers typically already existing in the microprocessor to forward storehit data. By using already existing logic, the present invention advantageously allows for scaling of the number of pipeline stages without significantly increasing the microprocessor die size or introducing timing problems.

In another aspect, it is a feature of the present invention to provide an apparatus within a pipelined microprocessor for forwarding storehit data between stages of the microprocessor pipeline, the microprocessor being coupled to a bus for transferring data between the microprocessor and a memory. The apparatus includes at least one response buffer and forwarding logic. The response buffer has at least first and second inputs and an output. The first input is coupled to the bus. The second input is coupled to a first stage of the pipeline that provides store results. The output is coupled to a second stage of the pipeline that receives load instruction data. The forwarding logic forwards the store results from the response buffer to the second pipeline stage in response to detection of a storehit condition.

In yet another aspect, it is a feature of the present invention to provide an apparatus for forwarding storehit data from a response buffer within a pipelined microprocessor, wherein the response buffer is configured to receive data from a bus coupled to the microprocessor in response to store instruction misses of a data cache within the microprocessor. The apparatus includes a first multiplexer and a second multiplexer. The first multiplexer has an output coupled to an input of the response buffer, a first input for receiving the data from the bus, and a second input for receiving store instruction results from the microprocessor pipeline. The second multiplexer has a first input coupled to an output of the response buffer, a second input operatively coupled to the data cache, and an output coupled to the pipeline.

In yet another aspect, it is a feature of the present invention to provide a pipelined microprocessor coupled to a system memory. The microprocessor includes a data cache, at least one response buffer and forwarding logic coupled to the response buffer. The data cache caches data from the system memory. The response buffer receives data from the system memory for updating the cache and for storing at least one store instruction result. The forwarding logic forwards the store instruction result from the response buffer to a load instruction in the microprocessor pipeline in response to a storehit condition with the store instruction results generated by the load instruction.

In yet another aspect, it is a feature of the present invention to provide a method for forwarding storehit data in a pipelined microprocessor having a plurality of response buffers for receiving data from a system memory coupled to the microprocessor, the microprocessor having a cache memory. The method includes determining whether one of the plurality of response buffers is idle in response to detecting a miss of the cache miss generated by a store instruction, storing the store instruction results in the response buffer if the response buffer is idle, forwarding the store results to a load instruction in the pipeline in response to detecting a storehit condition with the store results generated by the load instruction.

In yet another aspect, it is a feature of the present invention to provide a method for forwarding storehit data in a pipelined microprocessor having a plurality of response buffers for receiving data from a system memory coupled to the microprocessor, the microprocessor having a cache memory. The method includes writing a store instruction result to one of the plurality of response buffers, detecting a storehit condition with respect to the store instruction result and a load instruction executing in the pipeline, and forwarding the store instruction result to the load instruction in response to detecting the storehit condition.

BRIEF DESCRIPTION OF THE DRAWINGS

These and other objects, features, and advantages of the present invention will become better understood with regard to the following description, and accompanying drawings where:

FIG. 2 is a flow chart illustrating forwarding of storehit data from the response buffers of FIG. 1 when the microprocessor of FIG. 1 is configured to perform write allocate operations and a store instruction generates a cache miss according to the present invention.

DETAILED DESCRIPTION

Figure 1B:
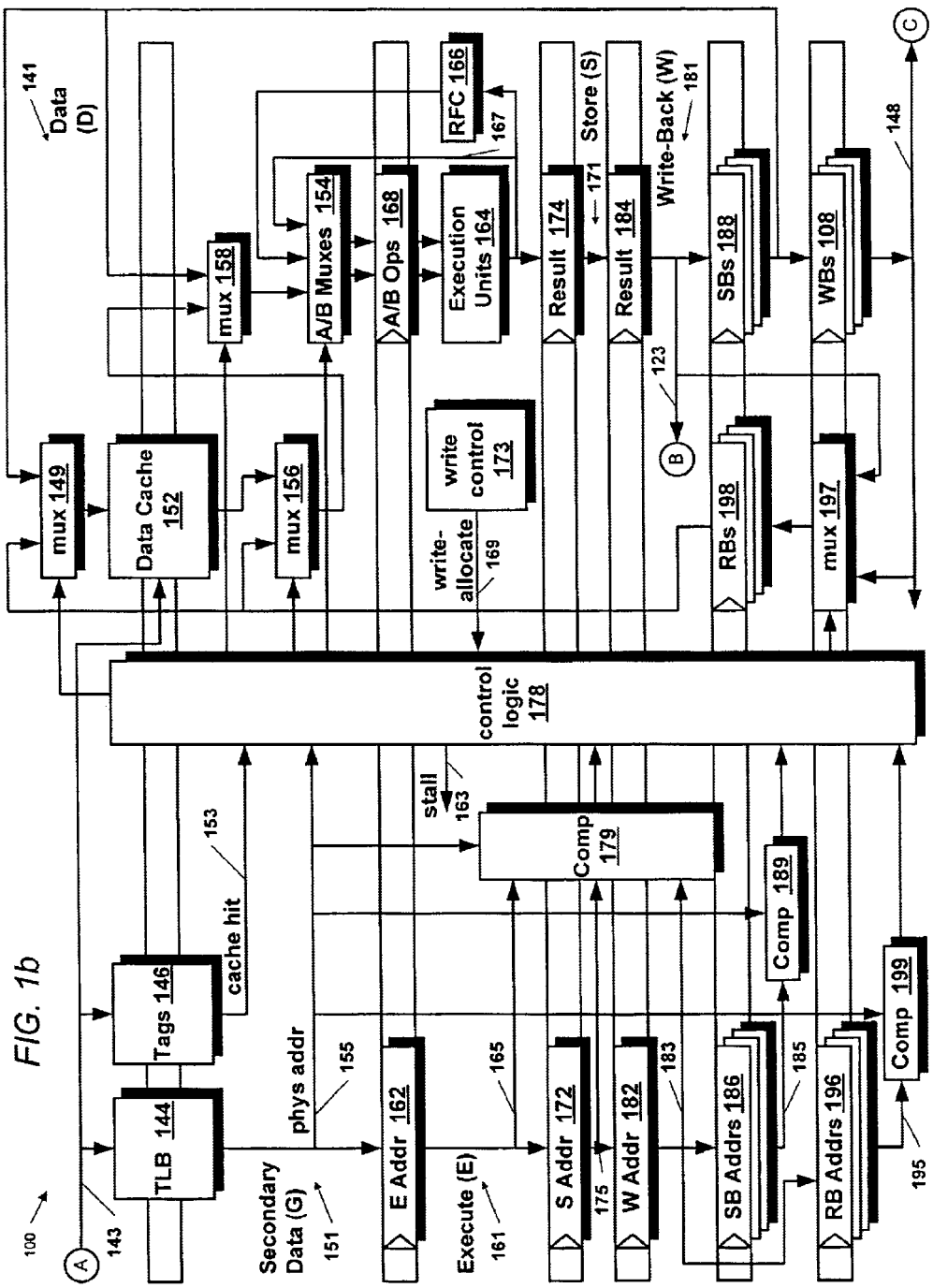
FIG. 1 is a block diagram of a pipelined microprocessor according to the present invention.

Referring to FIG. 1, a block diagram of a pipelined microprocessor 100 according to the present invention is shown. The microprocessor 100 comprises various pipeline stages including: Instruction Fetch (I) stage 101, Translation (T) stage 111, Register (R) stage 121, Address (A) stage 131, Data (D) stage 141, Secondary Data (G) stage 151, Execution (E) stage 161, Store (S) stage 171 and WriteBack (W) stage 181. Instructions enter at the top of the pipeline 100 in the I-stage 101 and exit, i.e., are retired, at the bottom of the pipeline in the W-stage 181 where the microprocessor 100 state is updated.

The I-stage 101 comprises an instruction pointer register 102 that stores a memory address of the next instruction, or cache line containing the next instruction, to be fetched from an instruction cache 104 coupled to the instruction pointer 102. The instruction cache 104 is a memory, such as an L1 cache, that caches previously fetched program instructions from a system memory 194 coupled to the microprocessor 100 by a processor bus 148. Preferably, the system memory 194 comprises a hierarchical memory system, such as a main dynamic random access memory (DRAM) and an L2 cache memory. Preferably, bus 148 allows multiple simultaneously outstanding requests for data from system memory 194. Preferably, bus 148 also allows outstanding requests to complete on bus 148 out of order with respect to the order the requests were issued. Instructions fetched from the instruction cache 104 are placed into an instruction buffer 112 coupled to the instruction cache 104.

The T-stage 111 comprises a translator 114, coupled to the instruction buffer 112, which translates program macroinstructions into microinstructions, such as load and store instructions. A load instruction loads data from memory 194 into the microprocessor 100. A store instruction stores data from the microprocessor 100 into memory 194. Preferably, the macroinstructions are x86 instructions. The microinstructions are simpler instructions than the macroinstructions that may be quickly executed by the various stages of the microprocessor 100. A single macroinstruction may be translated by translator 114 into multiple microinstructions.

In one embodiment, T-stage 111 translates macroinstructions into ld-alu (load data and perform arithmetic/logical operation on the loaded data) or ld-alust (load data, perform arithmetic/logical operation, store result) microinstructions. The generation of ld-alu and ld-alu-st instructions are described in more detail in copending U.S. patent application Ser. No. 09/313,908, entitled, PAIRING OF LOAD-ALU-STORE WITH CONDITIONAL BRANCH, having the same assignee, which is hereby incorporated by reference. Ld-alu instructions may be referred to herein as load instructions and ld-alu-st instructions may be referred to herein as load and/or store instructions in that they load data from or store data to system memory 194.

The T-stage 111 further comprises a microcode ROM (read-only-memory) 116. Some macroinstructions, typically complex or infrequently executed macroinstructions, are performed by microinstruction sequences comprised in the microcode ROM 116 rather than by microinstructions translated by the translator 114. Additionally, microcode ROM 116 comprises microinstruction sequences for handling exceptions, such as page faults, interrupts, arithmetic errors and so forth.

The R-stage 121 comprises a register file 124 that stores the program-visible state of the microprocessor 100. Register file 124 is updated with instruction results from other pipeline stages via signal 123. Preferably, the register file 124 comprises a register set compatible with the x86 architecture. The register file 124 comprises operand registers used to calculate addresses, such as memory addresses used to access data in memory 194. Instructions and the operands specified thereby are placed in a register 132 for use by the A-stage 131.

The A-stage 131 comprises an address generator 134 that receives operands from register 132 and generates addresses from the operands for storage in a register 142. Preferably, the addresses generated by address generator 134 are linear, or virtual, addresses for addressing data or instructions in memory 194 as defined by the x86 architecture. The data addresses are provided to other pipeline 100 stages via address signal 143.

The D-stage 141 and G-stage 151 comprise a data cache 152 that caches system memory 194 data. The data cache 152 is addressed by data addresses 143 received from address generator 134. In one embodiment, data accesses to data cache 152 require two processor clock cycles.

The D-stage 141 and G-stage 151 also comprise cache tags 146, that receive virtual address 143, and generate a cache hit signal 153 to indicate whether the data specified by virtual address 143 is present in data cache 152.

The D-stage 141 and G-stage 151 also comprise a translation lookaside buffer (TLB) 144, for translating virtual address 143 into a physical load or store address 155 of a store instruction executing in the G-stage 151. The address 155 generated by TLB 144 is piped down through the pipeline 100 via registers 162, 172, and 182, for storing store addresses 165, 175 and 183 of store instructions executing in the E-stage 161, S-stage 171, and W-stage 181, respectively. Comparators 179 compare E-stage store address 165, S-stage store address 175 and W-stage store address 183 with G-stage load address 155 to determine whether a storehit has occurred between a load instruction in the G-stage 151 and store instructions in the E-stage 161, S-stage 171 and W-stage 181, respectively.

Additionally, the store addresses are piped down to a plurality of store buffer address registers 186, for storing store addresses 185 of store result data stored in a plurality of store buffers 188. Preferably, store buffers 188 comprise four store buffers for storing up to four cache lines of data. Comparators 189 compare the store buffer store addresses 185 with the G-stage load address 155 to determine whether a storehit has occurred between a load instruction in the G-stage 151 and store result data in the store buffers 188.

Furthermore, store addresses are piped down to a plurality of response buffer address registers 196, for storing store addresses 195 of store results stored in a plurality of response buffers 198. Comparators 199 compare the response buffer store addresses 195 with the G-stage load address 155 to determine whether a storehit has occurred between a load instruction in the G-stage 151 and store result data in the response buffers 198.

The E-stage 161 comprises one or more execution units 164 and a results forwarding cache (RFC) 166. Preferably, execution unit 164 comprises an integer arithmetic logic unit, a floating point unit and an MMX unit. Under certain conditions, the pipeline may be stalled, as indicated on stall signal 163 generated by control logic 178, from the E-stage 161 upward waiting for the correct data to be forwarded or obtained from the processor bus 148.

The execution units 164 receive operands, including storehit data, from a pair of operand registers 168. The operands stored in operand registers 168 are received from a number of sources, including: results directly from the output of the execution units 164 via signal 167, RFC 166, data cache 152, store buffers 188 and response buffers 198, as will be described in more detail below.

The execution units 164 generate results using the operands from the operand registers 168 and place the results in a result register 174. The results are further provided to result register 184 and finally are written back into register file 124 via signal 123 to update the program-visible state of the microprocessor 100 if specified by the instruction.

The results generated by execution units 164 are also written into RFC 166. RFC 166 comprises a cache for storing intermediate microinstruction results, including store instruction results. In one embodiment, RFC 166 comprises a first-in-first-out (FIFO) cache memory having five entries for storing intermediate results of five instructions.

The RFC 166 forwards results to multiplexers 154 for selective forwarding to operand registers 168 for consumption by execution units 164. In particular, if a load address specified by a load instruction in the G-stage 151 matches a store address specified by a store instruction in the S-stage 171 or W-stage 181, then the storehit data is provided from RFC 166 to execution units 164 if the data in the RFC 166 is the newest data. Forwarding of data from RFC 166, from signal 167 and from store buffers 188 is described in more detail in concurrently filed U.S. patent application Ser. No. 09/545,040, entitled, METHOD AND APPARATUS FOR SPECULATIVELY FORWARDING STOREHIT DATA IN A HIERARCHICAL MANNER, having the same assignee, which is hereby incorporated by reference.

The output of result register 184 is coupled to the input of store buffers 188. Store instruction results are provided from result register 184 to one of a plurality of store buffers 188 pending update of the data cache 152 with the data stored in store buffers 188.

The output of store buffers 188 is coupled to the input of a plurality of write buffers 108. The output of write buffers 108 is coupled to processor bus 148. Store results are written from write buffers 108 to system memory 194.

The output of result register 184 is also coupled to an input of a multiplexer 197. The output of multiplexer 197 is coupled to the input of response buffers 198, whereby store results are selectively provided to response buffers 198 as described in more detail with respect to FIGS. 2 through 4. The other input of multiplexer 197 is coupled to processor bus 148, for receiving data from system memory 194.

Response buffers 198 are configured to receive data, such as cache lines for updating data cache 152, from system memory 194 and to receive store results from the microprocessor pipeline 100, namely result register 184. Preferably, a cache line in data cache 152 comprises 32 bytes of data. Preferably, response buffers 198 comprise registers for storing a cache line, i.e., 32 bytes of data.

Multiplexer 197 is controlled by control logic 178 to select either data from system memory 194 or from result register 184. Control logic 178 controls multiplexer 197 in response to a number of signals including: cache hit signal 153, a write-allocate signal 169 and the outputs of comparators 179, 189 and 199. Operation of control logic 178 will be described in more detail below with respect to FIGS. 2 through 4.

Write-allocate signal 169 indicates whether microprocessor 100 is configured to perform write-allocate operations. Preferably, write-allocate signal 169 is generated by a software programmable write-control register 173 within microprocessor 100. Alternatively, write-allocate signal 169 comprises an input to microprocessor 100.

The input of data cache 152 is coupled to a multiplexer 148. One input of multiplexer 148 is coupled to the output of store buffers 188. The other input of multiplexer 148 is coupled to the output of response buffers 198. The output of data cache 152 is coupled to an input of a multiplexer 156. The other input of multiplexer 156 is coupled to the output of response buffers 198. The output of multiplexer 156 is coupled to an input of a multiplexer 158. The other input of multiplexer 158 is coupled to the output of store buffers 188. The output of multiplexer 158 is coupled to an input of operand multiplexers 154. Each of multiplexers 148, 154, 156 and 158 are controlled by control logic 178, whose operation will be described in more detail below with respect to FIGS. 2 through 4.

Control logic 178 maintains status information regarding the order of use of the store buffers 188 and response buffers 198 in order to know which store buffer 188 and response buffer 198 has the newest data. That is, if multiple store buffers 188 or response buffers 198 contain data having the same physical address, control logic 178 is capable of determining from the status information into which of the store buffers 188 or response buffers 198 data was most recently written. In other words, control logic 178 is capable of determining the order of instructions coming down the pipeline 100 that write data to the same physical address.

Referring now to FIG. 2, a flow chart illustrating forwarding of storehit data from the response buffers 198 of FIG. 1 when the microprocessor of FIG. 1 is configured to perform write allocate operations and a store instruction generates a miss of data cache 152 of FIG. 1 according to the present invention is shown.

A store instruction proceeds down the pipeline to the G-stage 151 and generates a miss of data cache 152 as indicated by cache hit signal 153. That is, the store address of the store instruction is not currently cached in data cache 152 as determined by cache tags 146. Control logic 178 detects the cache miss, in step 202. In response, control logic 178 allocates a response buffer 198 for receiving the missing cache line, in step 204, and issues a request on processor bus 148 for the missing cache line from system memory 194, in step 206, in order to perform a write-allocate operation.

The store instruction proceeds down the pipeline 100 and the store results are written to store buffers 188, in step 208. In addition, control logic 178 determines that a cache miss has occurred and the microprocessor is configured to perform write allocates, as indicated by write-allocate signal 169. Therefore, control logic 178 controls multiplexer 197 to select store results from result register 184 for storage into response buffers 198, in step 208.

Subsequently, a load instruction proceeds down the pipeline 100 to the G-stage 151, where the load address 155 is compared with the various store addresses, including response buffer store addresses 195 by comparator 199, in step 212. Control logic 178 detects a storehit between the load address 155 and one or more of the response buffer store addresses 195, as indicated by the output of comparator 199, in step 214. That is, comparator 199 indicates that one or more of the response buffer store addresses 195 match the load address 155, thereby indicating that the load data specified by the load address 155 is present in response buffers 198.

In response, control logic 178 controls multiplexers 156, 158 and 154 to select the storehit data from the response buffer 198 for provision to operand registers 168, in step 216. That is, control logic 178 forwards storehit data from the response buffer 198 to the load instruction that has proceeded to the E-stage 161.

In addition, the missing cache line data requested from system memory 194 in step 206 is received into the response buffer 198, in step 218. The cache line is merged with the store results stored in the response buffer 198. That is, the bytes of the response buffer 198 holding the store results are maintained intact and the remaining bytes of the response buffer 198 are updated with the corresponding bytes of data received from system memory 194.

After step 218, the response buffer contains the most recent version of the cache line implicated by the storehit address. In response, control logic 178 controls multiplexer 148 to select the output of the response buffer 198 in order to update the data cache 152 with the contents of the response buffer 198, in step 222.

It should be noted that steps 212–216 and steps 218–222 may occur in either order or they may occur concurrently. That is, storehit data may be forwarded from the response buffer 198 prior to the update of the data cache 152 or the storehit data may be forwarded after the data cache 152 is updated or they may overlap in time. Furthermore, typically step 222, updating the data cache 152, is performed after the store data is written to system memory 194, described below.

Figure 3:
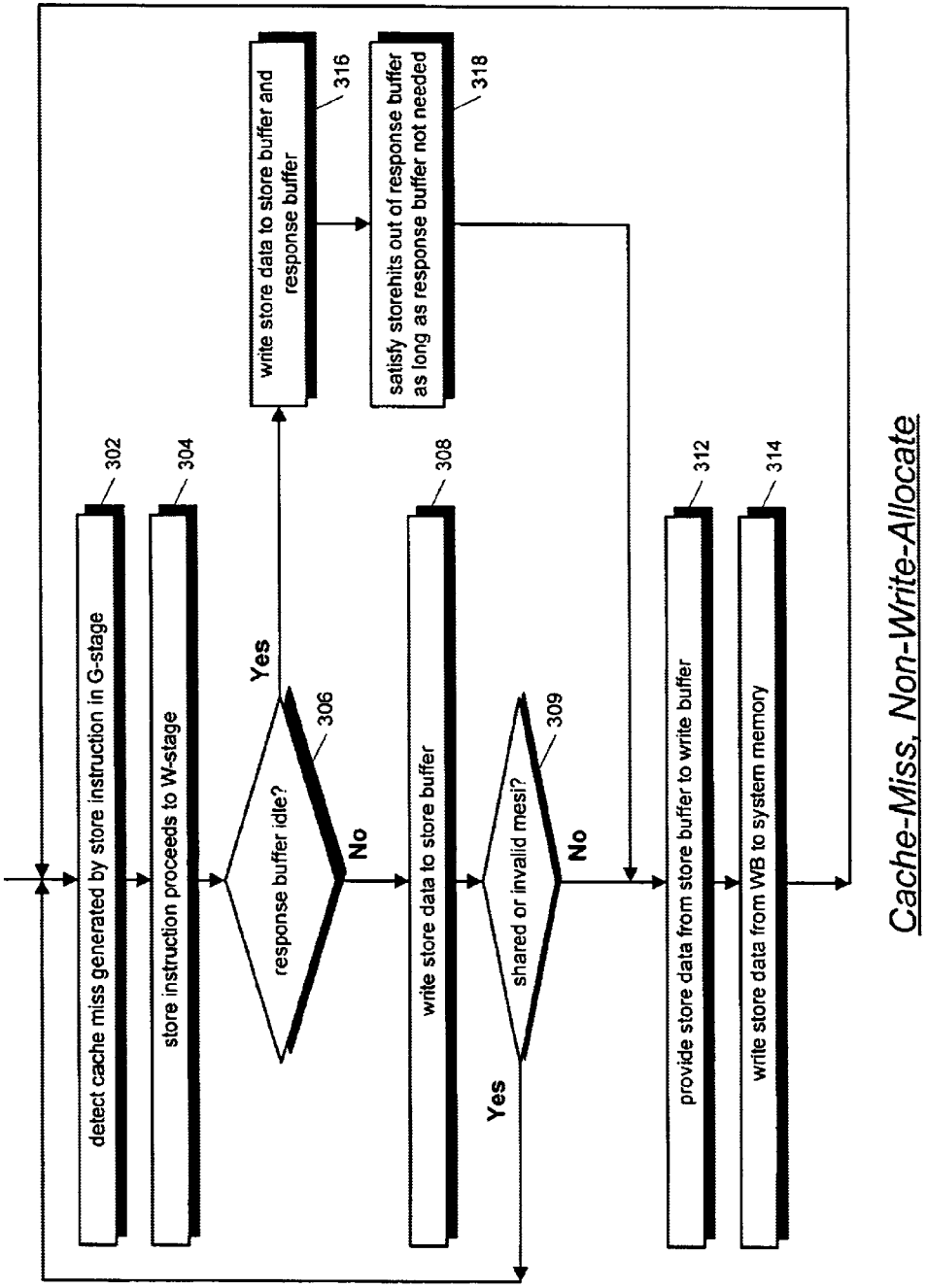
FIG. 3 is a flow chart illustrating forwarding of storehit data from the response buffers of FIG. 1 when the microprocessor of FIG. 1 is configured not to perform write allocate operations and a store instruction generates a cache miss according to the present invention.

Referring now to FIG. 3, a flow chart illustrating forwarding of storehit data from the response buffers 198 of FIG. 1 when the microprocessor of FIG. 1 is configured not to perform write allocate operations and a store instruction generates a miss of data cache 152 of FIG. 1 according to the present invention is shown.

A store instruction proceeds down the pipeline to the G-stage 151 and generates a miss of data cache 152 as indicated by cache hit signal 153. Control logic 178 detects the cache miss, in step 302.

The store instruction proceeds down the pipeline 100 to the W-stage 181, in step 304. In addition, control logic 178 determines that a cache miss has occurred and the microprocessor is configured not to perform write allocates, as indicated by write-allocate signal 169. Therefore, control logic 178 determines whether one of response buffers 198 is idle, in step 306. Preferably, a response buffer 198 being idle comprises the response buffer 198 not currently being allocated to receive data from the processor bus 148, i.e., no bus 148 request is outstanding destined for the response buffer 198, even if the response buffer 198 contains valid store results that may be forwarded to the pipeline 100 to satisfy storehits.

If no response buffers 198 are idle, then the store results are only written to the store buffer 188, in step 308. However, if one or more of the response buffers 198 is idle, then an idle response buffer 198 is allocated and the store results are written to the response buffer 198 in addition to the store buffer 188, in step 316.

If the store results are written to the response buffer 198 in step 316, then storehits may be satisfied out of the response buffer 198 as long as the response buffer 198 is not needed to receive data from system memory 194, in step 318. That is, as load instructions proceed to the G-stage 151 and generate storehits with the data stored into the response buffer 198 in step 316, the storehit data is forwarded from the response buffer 198 to the load instruction in the E-stage 161, as described in step 216 of FIG. 2.

Once the store data is written to the store buffer 188 in step 308 or step 316, a test is performed to determine whether the store has a mesi state of shared or invalid in step 309. If the mesi state of the store is shared or invalid, then the process completes. Otherwise, the store results are provided to one of the write buffers 108, in step 312, and the store results are written to system memory 194 from the write buffer 108, in step 314.

Figure 4:
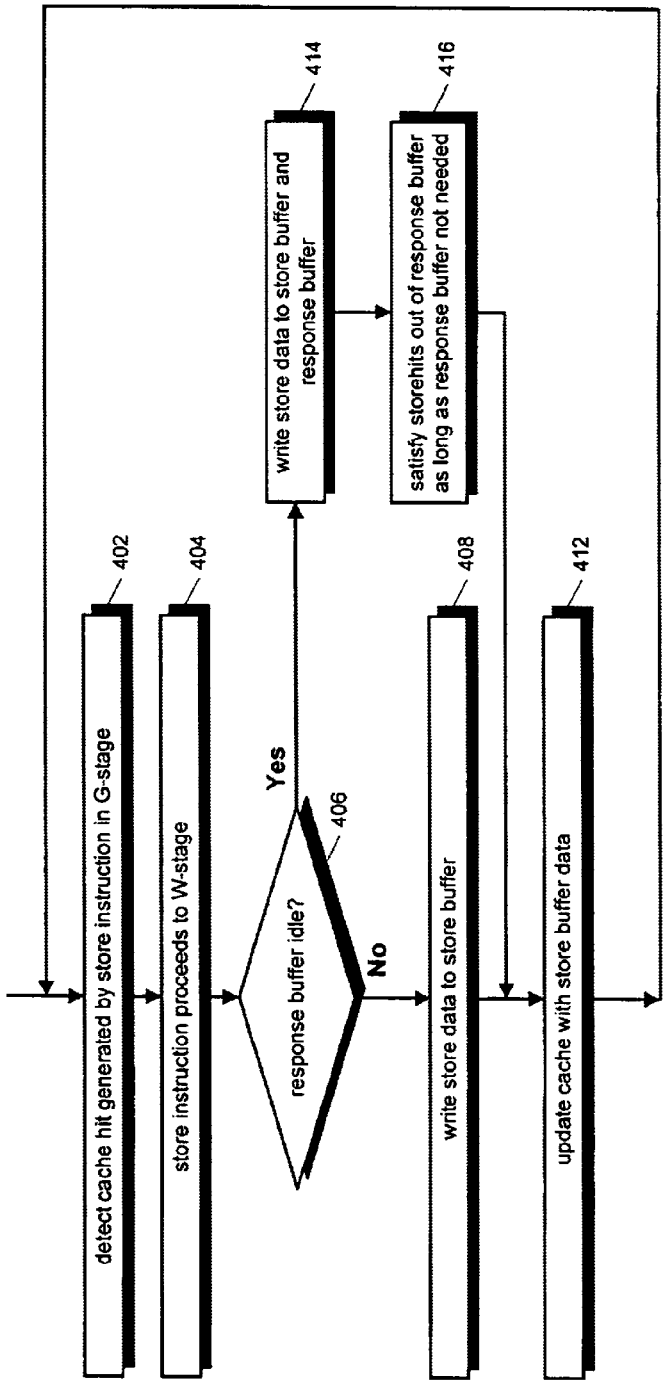
FIG. 4 is a flow chart illustrating forwarding of storehit data from the response buffers of FIG. 1 when a store instruction generates a cache hit according to the present invention.

Referring now to FIG. 4, a flow chart illustrating forwarding of storehit data from the response buffers 198 of FIG. 1 when a store instruction generates a hit of data cache 152 of FIG. 1 according to the present invention is shown.

A store instruction proceeds down the pipeline to the G-stage 151 and generates a hit of data cache 152 as indicated by cache hit signal 153. Control logic 178 detects the cache hit, in step 402.

The store instruction proceeds down the pipeline 100 to the W-stage 181, in step 404. Control logic 178 determines whether one of response buffers 198 is idle, in step 406.

If no response buffers 198 are idle, then the store results are only written to the store buffer 188, in step 408. However, if one or more of the response buffers 198 is idle, then an idle response buffer 198 is allocated and the store results are written to the response buffer 198 in addition to the store buffer 188, in step 414.

If the store results are written to the response buffer 198 in step 414, then storehits may be satisfied out of the response buffer 198 as long as the response buffer 198 is not needed to receive data from system memory 194, in step 416. That is, as load instructions proceed to the G-stage 151 and generate storehits with the data stored into the response buffer 198 in step 316, the storehit data is forwarded from the response buffer 198 to the load instruction in the E-stage 161, as described in step 216 of FIG. 2.

Once the store data is written to the store buffer 188 in step 408 or step 414, control logic 178 controls multiplexer 148 to update data cache 152 with the store results from the store buffer 188, in step 412.

Although the present invention and its objects, features, and advantages have been described in detail, other embodiments are encompassed by the invention. For example, the number and size of the response buffers may vary and scale with the size of the pipeline. In addition, when to make a determination of whether a response buffer is idle, i.e., which stage in the pipeline the miss-generating store instruction is located, may be varied, in order to optimize performance for a particular pipeline configuration. Finally, how long the store results are maintained in the response buffers for hopeful forwarding of storehit data may vary in order to optimize performance for a given pipeline configuration.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus for forwarding storehit data within a pipelined microprocessor having a cache memory and coupled to a system memory, the apparatus comprising:

at least one response buffer, for receiving data from the system memory to update the cache in response to a store instruction miss of the cache and for receiving store results of said store instruction in response to said cache miss;

forwarding logic, for forwarding said store results from said response buffer to a load instruction in the pipeline in response to a storehit condition between said load and store instructions; and an input, coupled to said forwarding logic, for indicating whether the microprocessor is configured to perform write-allocate operations with respect to the cache memory, wherein said forwarding logic is configured to forward said store results from said response buffer unless said store instruction generated said miss in said cache and said input indicates the microprocessor is not configured to perform write-allocate operations.

2. The apparatus of claim 1, wherein said load instruction is subsequent to said store instruction in the pipeline.

3. The apparatus of claim 1, wherein said storehit condition between said load and store instructions comprises a match of a load and a store address, wherein said load address specifies a location in the system memory from which load data of said load instruction is to be fetched, wherein said store address specifies a location in the system memory wherein said store results of said store instruction are to be stored.

4. The apparatus of claim 3, further comprising:

an address register, for storing said store address specifying said store results in said response buffer; and a comparator, for comparing said address register store address with said load address and generating a signal to indicate said storehit condition.

5. The apparatus of claim 3, wherein said data from the system memory comprises a cache memory line implicated by said store address.

6. The apparatus of claim 1, wherein said response buffer is configured to store a plurality of bytes, and to store only a portion of bytes of said data from the system memory not occupied by bytes of said store results upon reception of said data from the system memory.

7. The apparatus of claim 1, further comprising:

a multiplexer, having at least first and second inputs and an output, said first input coupled to a bus coupling the microprocessor to the system memory for receiving said data from the system memory, said second input coupled to the pipeline for receiving said store results, said output coupled to said response buffer for selectively providing to said response buffer said data from the system memory and said store results.

8. The apparatus of claim 1, further comprising:

a multiplexer, having at least first and second inputs and an output, said first input coupled to said response buffer for receiving said store results from said response buffer, said second input coupled to the cache memory for receiving cache data from said cache, said output coupled to the pipeline for selectively providing to the pipeline said cache data and said store results in response to load instructions executing in the pipeline.

9. The apparatus of claim 1, further comprising:

a buffer, coupled between the pipeline and the system memory, for receiving said store results from the pipeline and storing said store results until said store results are written to the system memory.

10. The apparatus of claim 1, wherein if the microprocessor is configured not to perform write-allocate operations with respect to the cache memory, said store results are stored in said response buffer in response to said cache miss only if at least one of said at least one response buffer is idle.

11. An apparatus within a pipelined microprocessor for forwarding storehit data between stages of the microprocessor pipeline, the microprocessor being coupled to a bus for transferring data between the microprocessor and a memory, the apparatus comprising:

at least one response buffer, having at least first and second inputs and an output, said first input coupled to the bus, said second input coupled to a first stage of the pipeline providing store results of a store instruction, said output coupled to a second stage of the pipeline receiving load instruction data;

forwarding logic, for forwarding said store results from said response buffer to said second pipeline stage in response to detection of a storehit; and an input, coupled to said forwarding logic, for indicating whether the microprocessor is configured to perform write-allocate operations with respect to a data cache of the microprocessor, wherein said forwarding logic is configured to forward said store results from said response buffer unless said store instruction generated a missing said cache and said input indicates the microprocessor is not configured to perform write-allocate operations.

12. An apparatus for forwarding storehit data from a response buffer within a pipelined microprocessor, wherein the response buffer is configured to receive data from a bus coupled to the microprocessor in response to store instruction misses of a data cache within the microprocessor, the apparatus comprising:

a first multiplexer, comprising an output coupled to an input of the response buffer, a first input for receiving the data from the bus, and a second input for receiving store instruction results from the microprocessor pipeline;

a second multiplexer, comprising a first input coupled to an output of the response buffer, a second input operatively coupled to the data cache, and an output coupled to the pipeline; and an input, coupled to said second multiplexer, for indicating whether the microprocessor is configured to perform write-allocate operations with respect to the data cache, wherein said second multiplexer is configured to select said first input to receive said store instruction results from said response buffer unless said store instruction generated a miss in said cache and said input indicates the microprocessor is not configured to perform write-allocate operations.

13. The apparatus of claim 12, further comprising:

control logic, coupled to said first and second multiplexers, configured to control said first multiplexer to select said store instruction results and to control said second multiplexer to select said store instruction results from the response buffer in response to detection of a storehit condition.

14. A pipelined microprocessor coupled to a system memory, the microprocessor comprising:

a data cache, for caching data from the system memory;

at least one response buffer, for receiving data from the system memory for updating said cache and for storing at least one store instruction result;

forwarding logic, coupled to said response buffer, for forwarding said store instruction result from said response buffer to a load instruction in the microprocessor pipeline in response to a storehit condition with said store instruction results generated by said load instruction; and an input, coupled to said forwarding logic, for indicating whether the microprocessor is configured to perform write-allocate operations with respect to said data cache, wherein said forwarding logic is configured to forward said store instruction result from said response buffer unless said store instruction generated a miss in said cache and said input indicates the microprocessor is not configured to perform write-allocate operations.

15. The microprocessor of claim 14, further comprising:

at least one store buffer, coupled to said cache, for storing said store results for updating said cache, wherein said microprocessor is configured to write said store results into said store buffer in addition to writing said store results into said response buffer.

16. A method for forwarding storehit data in a pipelined microprocessor having a plurality of response buffers for receiving data from a system memory coupled to the microprocessor, the microprocessor having a cache memory, the method comprising:

determining whether one of the plurality of response buffers is idle in response to detecting a miss of the cache generated by a store instruction, only if the microprocessor is not configured to perform write-allocate operations;

storing said store instruction results in said response buffer if one of the plurality of response buffers is idle; and forwarding said store results to a load instruction in the pipeline in response to detecting a storehit condition with said store results generated by said load instruction.

17. The method of claim 16, further comprising:

writing said store results to a buffer of the microprocessor for subsequent writing of said store results to the system memory in response to said cache miss detecting.

18. The method of claim 16, wherein said determining whether one of the response buffers is idle is performed in a first stage of the pipeline subsequent to a second stage of the pipeline where said detecting said cache miss is performed.

19. The method of claim 16, wherein said forwarding is performed for subsequent load instructions until said one of the response buffers is allocated for another operation.

20. A method for forwarding storehit data in a pipelined microprocessor having a plurality of response buffers for receiving data from a system memory coupled to the microprocessor, the microprocessor having a cache memory, the method comprising:

writing a store instruction result to one of the plurality of response buffers;

detecting a storehit condition with respect to said store instruction result and a load instruction executing in the pipeline;

determining whether the microprocessor is configured to perform write-allocate operations with respect to the cache memory; and forwarding said store instruction result to said load instruction in response to said detecting said storehit condition, only if said store instruction generated a miss in the cache and the microprocessor is not configured to perform write-allocate operations.

21. The method of claim 20, further comprising:

writing said store instruction result to the system memory.

22. The method of claim 20, further comprising:

detecting a miss of the cache generated by said store instruction prior to said writing said store instruction result to said one of the plurality of response buffers;

wherein said writing said store instruction result is performed in response to said detecting said cache miss.

23. The method of claim 22, further comprising:

issuing a request to the system memory for a cache line missing in the cache implicated by said store instruction in response to said detecting said cache miss.

24. The method of claim 23, further comprising:

receiving said missing cache line into said one of the response buffers after said issuing said request; and merging said missing cache line with said store instruction result in said one of the response buffers.

25. The method of claim 24, further comprising:

updating the cache with said missing cache line and said store instruction result after said merging.

26. The method of claim 22, further comprising:

writing said store instruction results to a buffer of the microprocessor for writing said store instruction results to the system memory in addition to said writing said store instruction result to said one of the plurality of response buffers.

* * * * *